(12) United States Patent
Handler et al.

(10) Patent No.: US 9,251,203 B2
(45) Date of Patent: Feb. 2, 2016

(54) USER INTERFACE FOR PREDICTIVE MODEL GENERATION

(71) Applicant: MModal IP LLC, Franklin, TN (US)

(72) Inventors: Jonathan A. Handler, Northbrook, IL (US); Juergen Fritsch, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 221 days.

(21) Appl. No.: 14/136,386

(22) Filed: Dec. 20, 2013

(65) Prior Publication Data

US 2014/0222784 A1 Aug. 7, 2014

Related U.S. Application Data

(60) Provisional application No. 61/745,577, filed on Dec. 22, 2012.

(51) Int. Cl.
*G06F 17/30* (2006.01)
*G06F 17/18* (2006.01)

(52) U.S. Cl.
CPC .......... *G06F 17/30424* (2013.01); *G06F 17/18* (2013.01); *G06F 17/30474* (2013.01); *G06F 17/30554* (2013.01); *G06F 17/30477* (2013.01)

(58) Field of Classification Search
CPC .................................................. G06F 17/30474
See application file for complete search history.

(56) References Cited

U.S. PATENT DOCUMENTS

| | | | | |
|---|---|---|---|---|
| 6,981,040 B1 * | 12/2005 | Konig | ............... | G06F 17/30867 707/E17.109 |
| 7,668,821 B1 * | 2/2010 | Donsbach | ......... | G06F 17/30867 707/765 |
| 2002/0198882 A1 * | 12/2002 | Linden | .............. | G06F 17/30867 |
| 2004/0045934 A1 | 3/2004 | Harvey | | |
| 2004/0049473 A1 | 3/2004 | Gower | | |
| 2004/0083084 A1 | 4/2004 | West | | |
| 2005/0154713 A1 * | 7/2005 | Glover | ............... | G06F 17/3097 |
| 2005/0234688 A1 | 10/2005 | Pinto | | |
| 2006/0247900 A1 | 11/2006 | Brocklebank | | |
| 2007/0162411 A1 * | 7/2007 | Kupershmidt | .... | G06F 17/30289 706/60 |
| 2008/0016051 A1 * | 1/2008 | Schiller | ............. | G06F 17/30241 |
| 2009/0192855 A1 | 7/2009 | Subramanian | | |
| 2010/0088306 A1 * | 4/2010 | Parson | ................... | G06N 5/025 707/706 |

(Continued)

FOREIGN PATENT DOCUMENTS

| | | |
|---|---|---|
| EP | 1936525 A1 | 6/2008 |
| WO | 2008039931 A2 | 4/2008 |

*Primary Examiner* — James E Richardson
(74) *Attorney, Agent, or Firm* — Robert Plotkin, P.C.; Robert Plotkin

(57) ABSTRACT

A dataset is searched using inclusion set criteria to produce an inclusion set and exclusion set criteria to produce an exclusion set. A set of unique content elements is identified from the inclusion set and the exclusion set. Metrics are derived from the inclusion set, exclusion set, and set of unique content elements, such as a measure, for each unique content element, of the absolute value of the difference between the percentage of records in the inclusion set containing the unique content element and the percentage of records in the exclusion set containing the unique content element. The unique content element set may be sorted and displayed in decreasing order of the above-referenced absolute value. The content element set may be filtered. Individual content elements may be excluded from the content set. A predictive model may be generated based on the resulting version of the content element set.

28 Claims, 5 Drawing Sheets

(56) References Cited

U.S. PATENT DOCUMENTS

2011/0119212 A1 5/2011 DeBruin
2011/0270797 A1 11/2011 Adams
2011/0313790 A1 12/2011 Yao

* cited by examiner

USER INTERFACE FOR PREDICTIVE MODEL GENERATION

BACKGROUND

Predictive models are used in a wide variety of contexts to predict the probability of an outcome. For example, a predictive model may be used to predict whether a previously unobserved unit of data (such as a record in a database) represents information associated with a particular outcome. In the context of healthcare, for example, predictive models may be used to predict whether data associated with a particular patient (such as data representing recent complaints of the patient) indicate that the patient is likely to experience a particular outcome, such as a readmission to a hospital. Although many tools exist to enable users to build predictive models, such tools require their users to have a sophisticated understanding of statistics.

What is needed, therefore, are tools that enable users who lack detailed knowledge of statistics to quickly and easily generate and validate predictive models against data, such as healthcare data (e.g., a free-text clinical documentation dataset).

SUMMARY

A dataset, which may include either or both of structured and unstructured data, is searched using inclusion set criteria to produce an inclusion set and exclusion set criteria to produce an exclusion set. A set of unique content elements, which may include either or both of free-form text elements and concept elements, is identified from the inclusion set and the exclusion set. Metrics are derived from the inclusion set, exclusion set, and set of unique content elements, such as a measure, for each unique content element, of the absolute value of the difference between the percentage of records in the inclusion set containing the unique content element and the percentage of records in the exclusion set containing the unique content element. The unique content element set may be sorted in order of any of the metrics or elements in the set, such as in decreasing order of the absolute value percentage difference of elements in the set, and the sorted set may be displayed to the user in the sorted order. The content element set may be filtered, such as by retaining only the first N elements in the sorted set, where N may be a user-selected value. Individual content elements may be excluded from the content set (e.g., manually by a user). A predictive model may be generated based on the resulting version of the content element set.

For example, one embodiment of the present invention is directed to a computer-implemented method which includes: (A) searching a first dataset for elements matching inclusion set criteria to identify an inclusion set, wherein the inclusion set comprises a first subset of the first dataset; (B) searching the dataset for elements matching exclusion set criteria to identify an exclusion set, wherein the exclusion set comprises a second subset of the first dataset; (C) identifying a set of unique content elements selected from the inclusion set and the exclusion set; (D) sorting the set of unique content elements to produce a sorted set of unique content elements; (E) filtering, from the sorted set of unique content elements, all but the first N elements in the sorted set of unique content elements to produce a filtered set of unique content elements; (F) excluding at least one content element from the filtered set of unique content elements to produce a final set of unique content elements; and (G) producing a predictive model based on the final set of unique content elements.

Other features and advantages of various aspects and embodiments of the present invention will become apparent from the following description and from the claims.

DETAILED DESCRIPTION

Embodiments of the present invention enable users who lack detailed knowledge of statistics to quickly and easily generate and validate predictive models against data, such as healthcare data (e.g., a free-text clinical documentation dataset). For example, embodiments of the present invention may use natural language processing to identify, codify, and annotate relevant concepts to be used as features by the predictive model.

Figure 2:
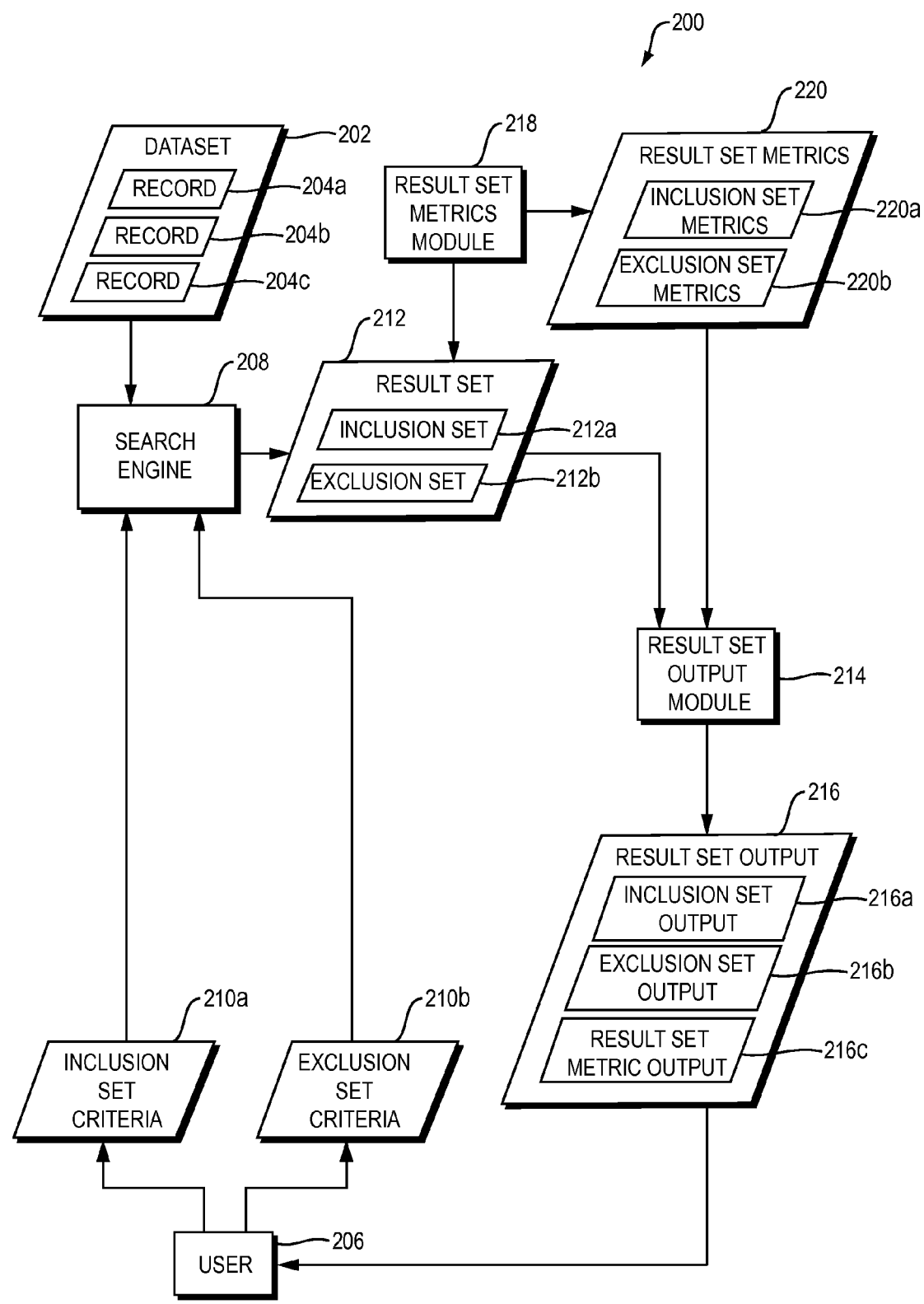
FIG. 2 is a dataflow diagram of a system for producing and displaying an inclusion set and an exclusion set according to one embodiment of the present invention.
Figure 3:
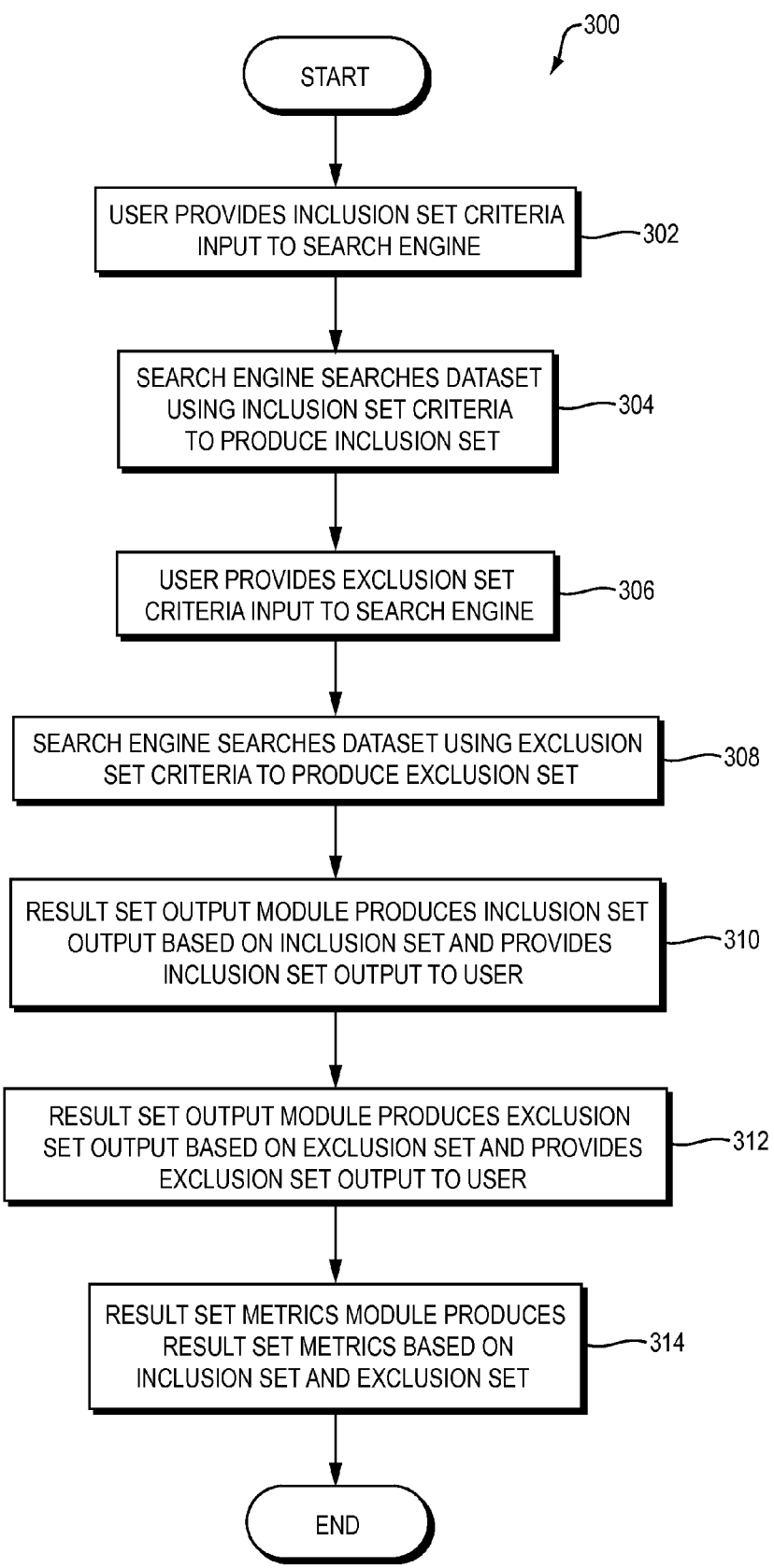
FIG. 3 is a flowchart of a method performed by the system of FIG. 1 according to one embodiment of the present invention.

For example, referring to FIG. 2, a dataflow diagram is shown of a system 200 according to one embodiment of the present invention. Referring to FIG. 3, a flowchart is shown of a method 300 that is performed by the system 200 of FIG. 2 according to one embodiment of the present invention.

The system 200 includes a dataset 202. In general, the dataset 202 includes a plurality of records 204a-c. Although only three records 204a-c are shown in FIG. 2 for ease of illustration, the dataset 202 may include any number of records. In practice, for example, the dataset 202 may include thousands or millions of records. Furthermore, although the dataset 202 is illustrated in FIG. 2 as a single dataset, the dataset 202 may be implemented as multiple datasets which collectively perform the same function in the system 200 as the single dataset 202 shown in FIG. 2. For example, the records 204a-c in the dataset may include some records contained in or derived from one dataset (e.g., a first database) and some records contained in or derived from another dataset (e.g., a second database). The records 204a-c in the dataset 202 may be "in" the dataset 204a-c by virtue of being copied into the dataset 202, by virtue of being referenced by the dataset 202, or a combination thereof.

The records 204a-c in the dataset 202 may take any of a variety of forms. For example, any particular record in the dataset 202 may be:
  discrete content, such as a record in a database, or a portion thereof (such as a field of a record in a database);
  free-form text content, such as a free-form text document (e.g., a document created by a word processing application or other text editing application) or a portion thereof, or free-form text contained within a data object that may also contain content other than free-form text content, such as free-form text content within a field of a database record or free-form text content within a document that also contains concept content, as described below;

concept content, which may, for example, take the form of free-form text content that has been supplemented with one or more tags (e.g., XML tags) or other discrete data elements which indicate that the free-form text content represents an instance of a particular concept in a form that is understandable automatically by a computer.

The dataset 202 may include any combination of the kinds of records described above. Examples of techniques that may be used to create concept content may be found in U.S. Pat. No. 7,584,103 B2, issued on Sep. 1, 2009, entitled, "Automated Extraction of Semantic Content and Generation of a Structured Document from Speech," which is hereby incorporated by reference herein. As described therein, a "structured document" may include a combination of free-form text content and concept content.

Although the dataset 202 may include data related to any one or more domains, the following description will focus on data representing healthcare information about patients. The dataset 202 may include records related to one or more patients. For example, records 204a and 204b may contain data relating to a first patient, while record 204c may contain data relating to a second patient.

As particular examples of records that may contain healthcare information, a record may include a set of unstructured clinical notes (e.g., progress notes, operative notes, discharge summaries) for one or more clinical encounters with a particular patient. As a further example, a record may include related structured data from an electronic health records (EHR) system and related billing data from a claims processing system.

Furthermore, the term "record" may refer, for example, to all data in the dataset 202 relating to a particular patient. For example, record 204a may represent all data in the dataset 202 relating to a first patient, record 204b may represent all data in the dataset 202 relating to a second patient, and record 204c may represent all data in the dataset 202 relating to a third patient. In this example, the record 204a may contain data from multiple sources, such as one or more sources of discrete data (e.g., one or more databases) and/or one or more sources of free-text data (e.g., one or more word processing documents). An individual record may include data which relates to an entity other than a patient (in addition to or instead of any of the other data described herein). For example, a record may include data related to a particular event (such as a particular patient visit) or to a particular document.

Consider a user 206 of the system 200 who is interested in identifying records within the dataset 202 which contain data having certain specified characteristics. As a particular example, assume that the user 206 is interested in identifying records within the dataset 202 which represent patients who have complained of chest pain and who are still alive. If all of the records containing data having the user-specified characteristics have been explicitly encoded with data that may be identified directly by a search engine 208 as having the user-specified characteristics, then the user 206 may identify those records simply by formulating a query specifying the user-specified characteristics and providing that query to the search engine 208. In response, the search engine 208 will provide a result set containing the records from the dataset 202 which satisfy the query, and which therefore represent data having the user-specified characteristics.

In many real-world cases, however, some or all of the records 204a-c in the dataset 202 will not be explicitly encoded with data that may be identified directly by the search engine 208 as having the user-specified characteristics. For example, a record in the dataset 202 may contain data related to a patient who complained of chest pain and who is still alive, but that record may not contain any data explicitly indicating that the patient complained of chest pain and/or explicitly indicating that the patient is still alive. Therefore, instructing the search engine 208 to perform a query that searches directly for the user-specified characteristics, such as by instructing the search engine 208 to search for records in which the "complaint" field contains the text "chest pain" may fail to uncover records representing patients who have complained of chest pain and who are still alive.

To address this problem, embodiments of the present invention enable users to create predictive models which predict whether particular records in the dataset 202 satisfy user-specified criteria, whether or not such records are explicitly encoded with data indicating that the records satisfy those user-specified criteria. Such predictive models may then be used to search for and identify records in the dataset 202 which are likely to satisfy the user-specified criteria, even though those records are not explicitly encoded to indicate that those records satisfy the user-specified criteria. The user-specified criteria may, for example, represent outcomes that have already occurred (such as a patient's past complaint of chest pain) or possible future outcomes that have yet to occur (such as the patient's death). The predictive models employed by embodiments of the present invention may, therefore, be used to determine whether records in the dataset 202 represent past outcomes which satisfy user-specified criteria and to determine (predict) whether records in the dataset indicate possible future outcomes which satisfy user-specified criteria. Examples of techniques that may be used to generate such predictive models will now be described.

The user 206 may provide inclusion set criteria 210a as input to the search engine 208 (FIG. 3, operation 302). In general, the inclusion set criteria 210a represents one or more inclusion set criteria. The inclusion set criteria consist of one or more criteria (characteristics) that are of interest to the user 206. One goal of the system 200 is to generate a predictive model which predicts whether records (such as previously unobserved records) contain data which satisfy the inclusion set criteria represented by the inclusion set criteria input 210a.

The search engine 208 receives the inclusion set criteria input 210a and performs a search of the dataset 202, using a query which includes the inclusion set criteria represented by the inclusion set criteria input 210a, thereby producing a result set 212a containing data from the dataset 202 which satisfies the inclusion set criteria (FIG. 3, operation 302). The result set 212a is therefore also referred to herein as the "inclusion set" 212a. The query may, for example, join the inclusion set criteria by one or more logical ANDs, one or more logical ORs, other Boolean operators, or any combination thereof.

The user 206 may also provide exclusion set criteria input 210b as input to the search engine 208 (FIG. 3, operation 306). In general, the exclusion set criteria input 210b represents one or more exclusion set criteria. The exclusion set criteria may include one or more criteria (characteristics) which, in combination, for example, represent the logical complement of the inclusion set criteria. For example, the user 206 may select the exclusion set criteria 210b to select records from the dataset that contain data which do not satisfy the inclusion set criteria. For example, if the inclusion set criteria specify patients who have complained of chest pain and who are alive, then the exclusion set criteria may specify patients who have complained of chest pain who are not alive.

The search engine 208 receives the exclusion set criteria input 210b and performs a search of the dataset 202, using a query which includes the exclusion set criteria represented by the exclusion set criteria input 210b, thereby producing a result set 212b containing data from the dataset 202 which satisfies the exclusion set criteria (FIG. 3, operation 308). The result set 212b is therefore also referred to herein as the "exclusion set" 212b. The query may, for example, join the exclusion set criteria by one or more logical ANDs, one or more logical ORs, other Boolean operators, or any combination thereof.

The system 200 also includes a result set output module 214, which produces and provides inclusion set output 216a to the user 206 based on the inclusion set 212a (FIG. 3, operation 310), and which produces and provides exclusion set output 216b to the user 206 based on the exclusion set 212b (FIG. 3, operation 312).

More generally, the union of the inclusion set 212a and the exclusion set 212b is referred to herein as the result set 212. Therefore, more generally the result set output module 214 may produce result set output 216 based on some or all of the result set 212.

The system 200 may also include a result set metrics module 218, which may generate a variety of metrics 220 based on the inclusion set 212a and/or the exclusion set 212b (FIG. 3, operation 314). The result set metrics 220 may, for example, include metrics 220a derived solely from the inclusion set 212a and metrics 220b derived solely from the exclusion set 212b. The result set metrics 220 may, however, also contain metrics derived from a combination of the inclusion set 212a and the exclusion set 212b. Particular examples of the result set metrics 220 will be described below.

The result set output 216 may also include result set metric output 216c which is produced by the result set output module 214 based on some or all of the result set metrics 220. For example, the result set metric output 216c may be derived from the inclusion set metrics 220a, the exclusion set metrics 220b, and/or other metrics within the result set metrics 220.

Having described certain aspects of embodiments of the present invention in general terms, example implementations of those aspects of embodiments of the present invention will now be described to illustrate the operation of certain embodiments of the present invention in practice. After describing such example implementations, examples of techniques that may be used to generate predictive models will be described.

Referring to FIG. 1, an illustration is shown of a graphical user interface (GUI) 100 that may be used to perform some of the functions described above in connection with FIGS. 1 and 2. The GUI 100 may, for example, be displayed by a display output component (e.g., monitor or touchscreen) of any kind of computing device (e.g., a desktop, laptop, or tablet computer).

Figure 1:
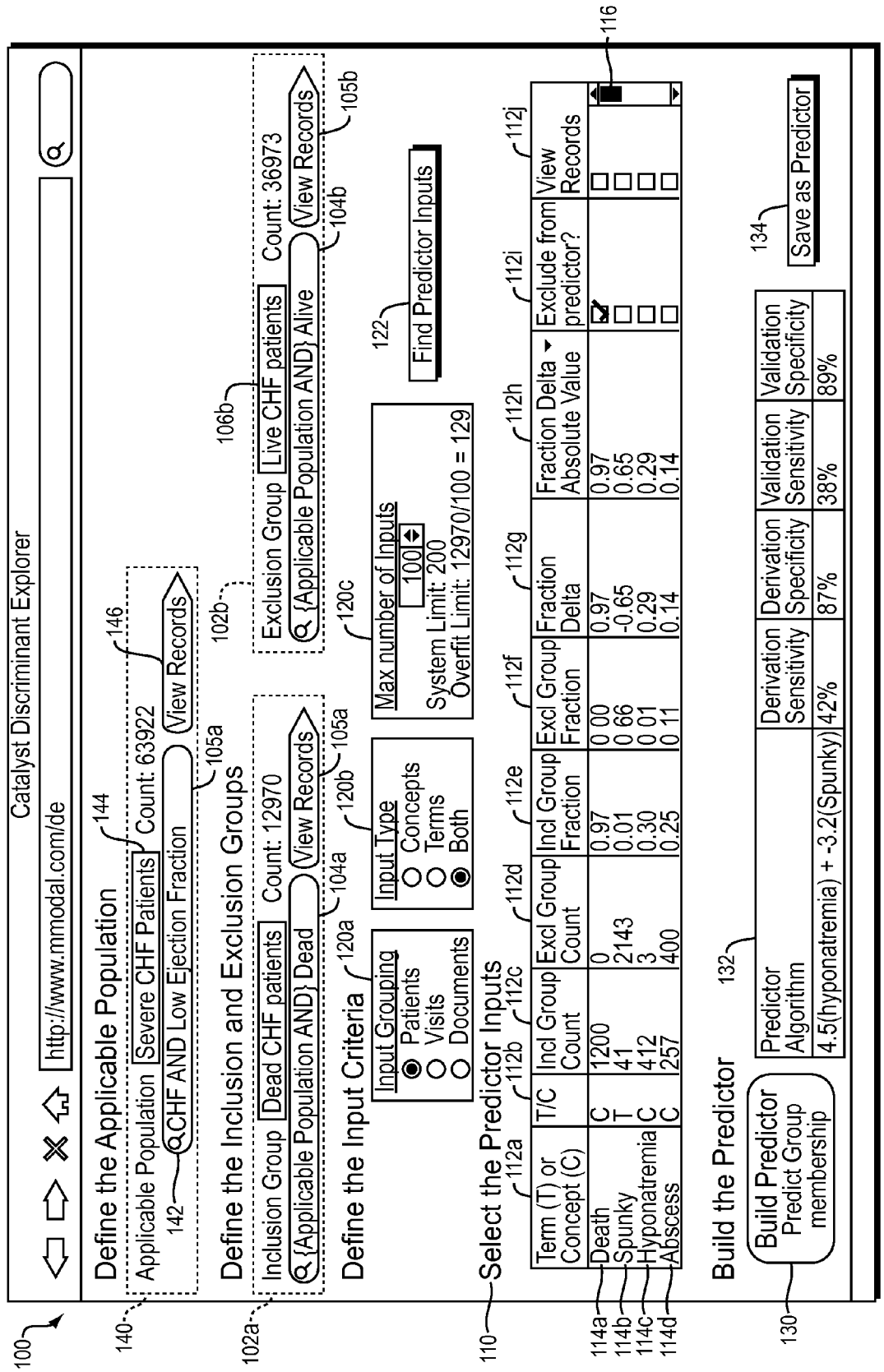
FIG. 1 is an illustration of a graphical user interface used by one embodiment of the present invention.

The GUI 100 includes an applicable population definition section 140, which receives input and provides output related to the population to which the user 206's query applies. For example, in FIG. 1, the applicable population definition section 140 includes an applicable population criteria input component 142, such as a text input field, for receiving applicable population criteria input from the user 206. In the example of FIG. 1 the user 206 is shown to have input the text "CHF AND Low Ejection Fraction" as the applicable population criteria input, thereby indicating that the user 206 desires the applicable population to consist of patients who have complained of chest pain and who have a low (e.g., <35%) ejection fraction.

The applicable population definition section 140 may also include an applicable population description input component 144, such as a text input field, for receiving input from the user 206 representing a name or brief description of the applicable population. In the example of FIG. 1 the user 206 is shown to have input the text "Severe CHF Patients" as a description of the applicable population.

The applicable population definition section 140 may also include a button 146 or other input component which the user 206 may select, in response to which the search engine 208 may query the dataset 202 using the applicable population criteria input (in component 142) to produce data records which match the applicable population definition input, and then display the resulting data records (not shown) to the user 206.

The GUI 100 also includes an inclusion set section 102a, which receives input and provides output related to the inclusion set 212a, and an exclusion set section 102b, which receives input and provides output related to the exclusion set 212b. For example, the inclusion set section 102a contains an inclusion set criteria input component 104a, such as a text input field, for receiving the inclusion set criteria input 210a from the user 206. In the example of FIG. 1, the user 206 is shown to have input the text "Applicable Population AND Dead" as the inclusion set criteria input 210a, indicating that the user 206 desires for the inclusion set criteria to specify patients who have complained of chest pain, who have a low (e.g., <35%) ejection fraction, and who are dead. Note that in this example, the inclusion of the text "Applicable Population" within the inclusion set criteria input 210a causes the applicable population inclusion criteria from component 142 (e.g., "CHF AND Low Ejection Fraction") to be included within the inclusion set criteria. As a result, the applicable population criteria input may be considered to be part of the inclusion set criteria input 210a.

The inclusion set section 102a may also include an inclusion set description input component 106a, such as a text input field, for receiving input from the user 206 representing a name or brief description of the inclusion set 212a. In the example of FIG. 1 the user 206 is shown to have input the text "Dead CHF patients" as a description of the inclusion set 212a.

The inclusion set section 102a may also include a button 105a or other input component which the user 206 may select, in response to which the search engine 208 may query the dataset 202 using the inclusion set criteria represented by the inclusion set criteria input 210a to produce the inclusion set 212a, and then display the resulting inclusion set 212a to the user 206.

Similarly, the exclusion set section 102b contains an inclusion exclusion set criteria input component 104b, such as a text input field, for receiving the exclusion set criteria input 210b from the user 206. In the example of FIG. 1, the user 206 is shown to have input the text "Applicable Population AND Alive" as the exclusion set criteria input 210b, indicating that the user 206 desires for the exclusion set criteria to specify patients who have complained of chest pain, who have a low ejection fraction, and who are alive. Note that in this example, the inclusion of the text "Applicable Population" within the exclusion set criteria input 210b causes the applicable population inclusion criteria from component 142 (e.g., "CHF AND Low Ejection Fraction") to be included within the exclusion set criteria represented by the exclusion set criteria input 210b. As a result, the applicable population criteria input may be considered to be part of the exclusion set criteria represented by the exclusion set criteria input 210b.

The exclusion set section 102b may also include an exclusion set description input component 106b, such as a text input field, for receiving input from the user 206 representing a name or brief description of the exclusion set 212b. In the example of FIG. 1 the user 206 is shown to have input the text "Live CHF patients" as a description of the exclusion set 212b.

The exclusion set section 102b may also include a button 105a or other input component which the user 206 may select, in response to which the search engine 208 may query the dataset 202 using the exclusion set criteria represented by the exclusion set criteria input 210b to produce the exclusion set 212b, and then display the resulting exclusion set 212b to the user 206.

It should be appreciated that the inclusion set criteria input 210a and the exclusion set criteria input 210b may take any form and that the examples shown in FIG. 1 are provided merely for purposes of illustration and do not constitute limitations of the present invention. For example, the inclusion set criteria input 210a and/or exclusion set criteria input 210b may be input using any query language. As another example, the system 200 may modify the inclusion set criteria input 210a and/or the exclusion set criteria input 210b after receiving them from the user 206 and before using them for searching. For example, the GUI 100 may enable the user 206 to provide the inclusion set criteria input 210a and/or the exclusion set criteria input 210b using graphical user interface components, after which the system 200 may use the input provided by the user 206 to generate textual queries representing the inclusion set criteria and/or the exclusion set criteria in any textual query language. More generally, embodiments of the present invention are not limited to any particular technique for receiving the inclusion set criteria input 210a and the exclusion set criteria input 210b from the user 206.

Furthermore, although the inclusion set criteria input 210a and the exclusion set criteria input 210b are shown in FIG. 2 as being provided to the system 200 solely by the user 206, this is merely an example and does not constitute a limitation of the present invention. For example, the inclusion set criteria input 210a and/or the exclusion set criteria input 210b may be provided by a plurality of users. As another example, the inclusion set criteria input 210a and/or the exclusion set criteria input 210b may be provided, in whole or in part, automatically by a computer. For example, the inclusion set criteria input 210a may be generated in part by the user 206 manually and in part by a computer automatically, as may the exclusion set criteria input 210b.

The description above mentioned that the result set metrics module 218 may generate various metrics 220 based on the result set 212. Particular examples of such metrics will now be described. Such example metrics are described herein solely for purposes of illustration and do not constitute limitations of the present invention.

Figure 4:
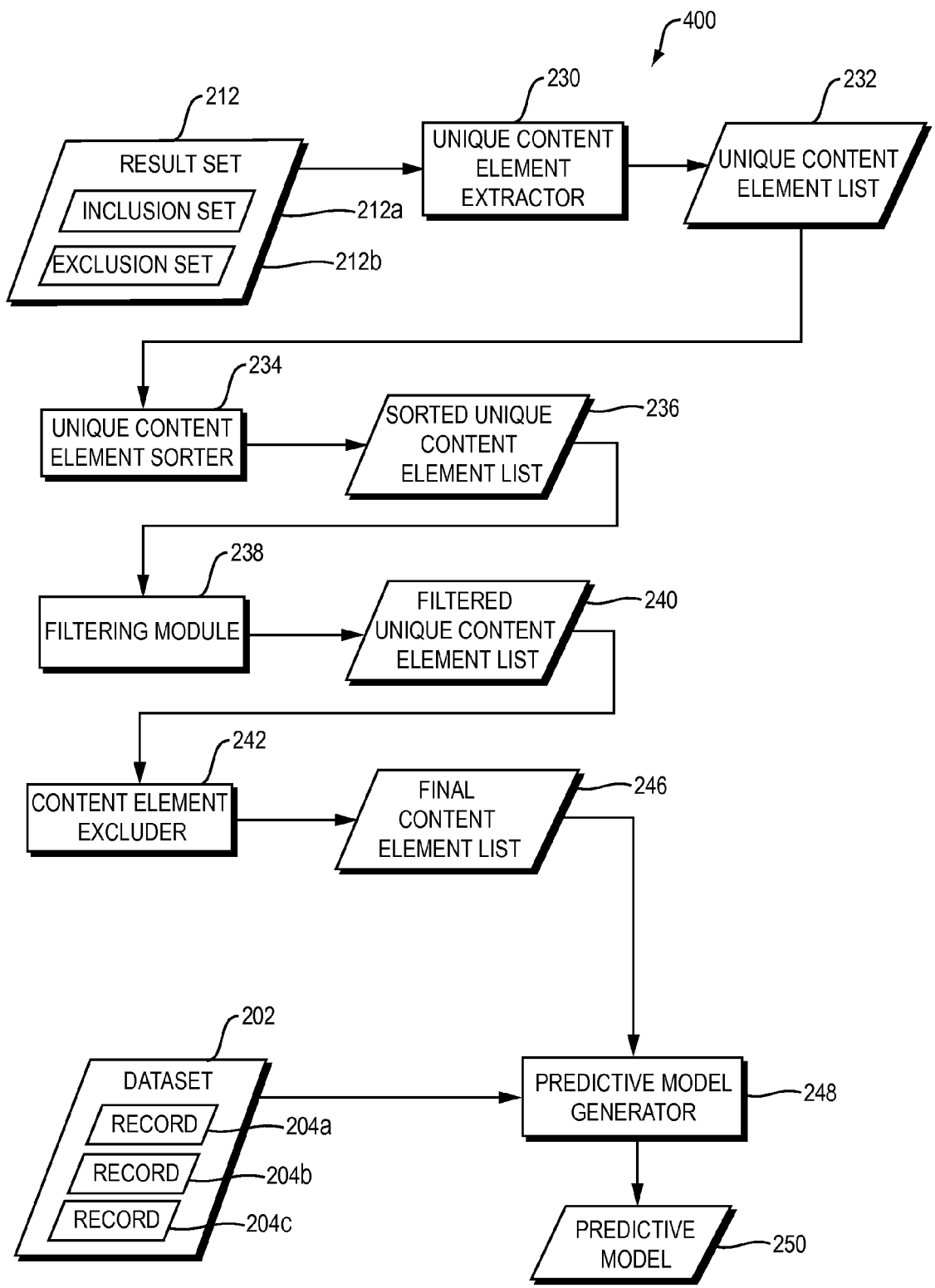
FIG. 4 is a dataflow diagram of a system for generating a predictive model according to one embodiment of the present invention.
Figure 5:
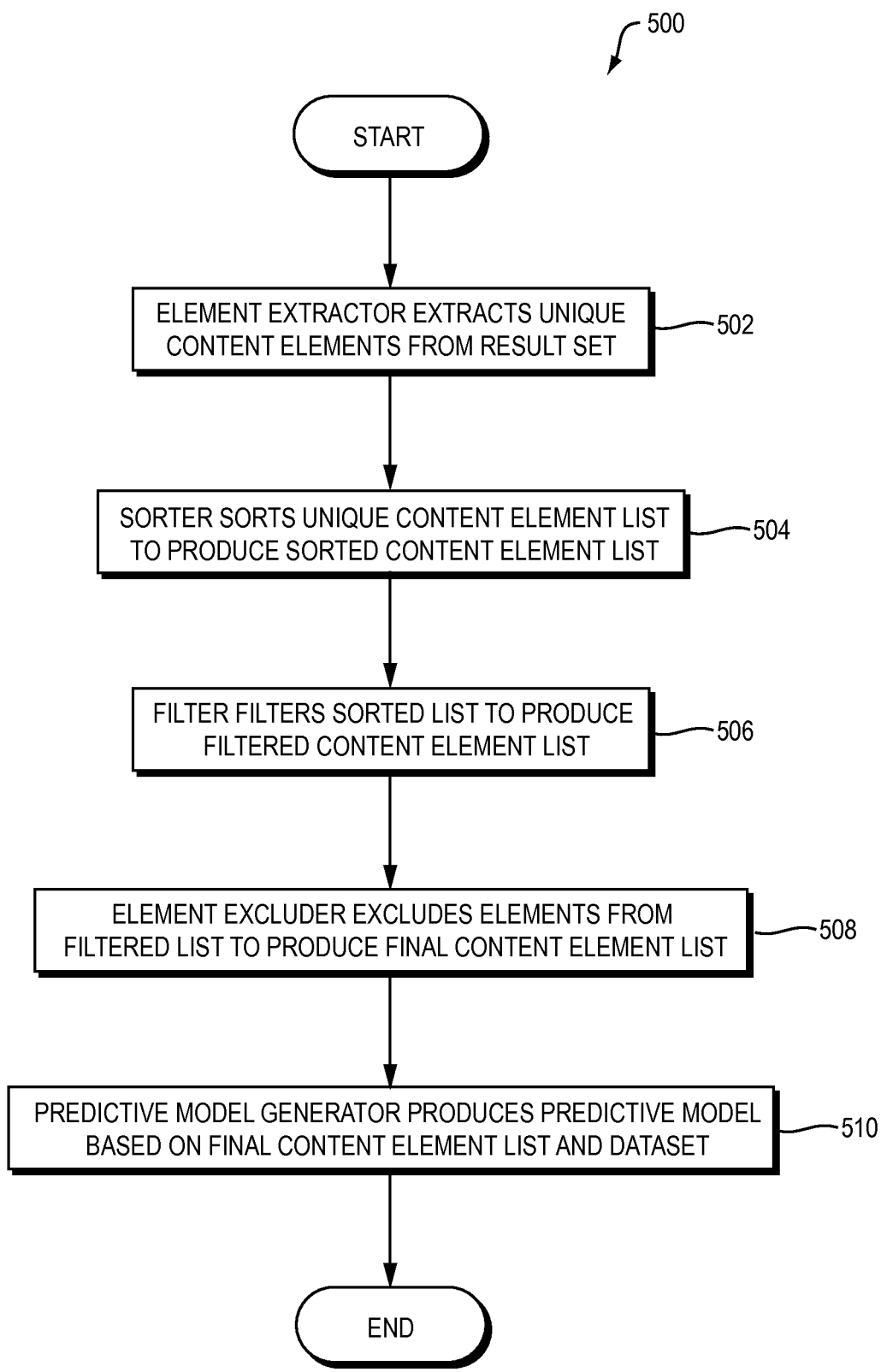
FIG. 5 is a flowchart of a method performed by the system of FIG. 4 according to one embodiment of the present invention.

Referring to FIG. 4, a dataflow diagram is shown of a system 400 that may work in cooperation with the system 200 of FIG. 2 to perform various functions herein. Referring to FIG. 5, a flowchart is shown of a method 500 performed by the system 400 of FIG. 4.

The system 400 may include a unique content element extractor 230, which may identify some or all of the unique content elements 232 in the result set 212 (FIG. 5, operation 502). Examples of a "content element," as that term is used herein, include individual units of free-form text content (such as an individual word or a contiguous phrase within the result set 212) and individual concept content (such as an instance of an encoded concept in the result set 212). The unique content element extractor 230 may, therefore, identify all unique units of free-form text and all unique units of concept content in the result set 212, possibly excluding certain content elements (such as stop words) based on pre-defined criteria. As a result, the unique content element list 232 may include solely free-form text elements, solely concept content elements, or both free-form text elements and concept content elements. Note that the set of unique content elements 232 identified by the unique content element extractor may include content elements that are not contained in the inclusion set criteria and/or the exclusion set criteria.

The GUI 100 shown in FIG. 1 may include a result set metrics area 110, which may display a variety of information about the result set metrics 220. The result set metrics area 110 in FIG. 1, therefore, is an example of the result set output 216 in FIG. 2. The system 200 may, for example, populate the result set metrics area 110 in response to an instruction from the user 206 (such as pressing button 122). As another example, the system 200 may populate and/or update the result set metrics area 110 automatically whenever the user 206 changes the input provided anywhere wherein the GUI 100.

The result set metrics area 110 in FIG. 1 is illustrated in the form of a table for purposes of example. The table includes rows 114a-d, each of which contains information related to a particular unique content element in the unique content element list 232. In the example of FIG. 1, row 114a contains information related to the encoded concept of "death," row 114b contains information related to the encoded concept of "aspirin," row 114c contains information related to the encoded concept of "hyponatremia," and row 114d contains information related to the encoded concept of "abscess." For ease of illustration, in metrics area 110 only four rows of the table are visible, but the scrollbar 116 is shown to indicate that the table may include additional rows that may be made visible by scrolling to them using the scrollbar 116. As the above description makes clear, the unique content element list 232 may contain fewer or greater than four content elements. If the unique content element list 232 contains more than four content elements, then the metrics area 110 may display only four of those content elements at a time, but the user 206 may scroll through the list of content elements 232 using scroll bar 116.

The table also includes columns 112a-i, each of which contains information relating to a particular property of the corresponding unique content element in the unique content element list 232. More specifically:

column 112a displays the content element (i.e., text or concept) represented by the corresponding row;
 column 112b displays an indication of whether the row represents a term (i.e., text) or a concept;
 column 112c displays a frequency of occurrence of the corresponding content element in the inclusion set 212a (e.g., the total number of occurrences of the corresponding content element in the inclusion set 212a), referred to herein as the "inclusion frequency";
 column 112d displays a frequency of occurrence of the corresponding content element in the exclusion set 212b (e.g., the total number of occurrences of the corresponding content element in the exclusion set 212b), referred to herein as the "exclusion frequency";
 column 112e displays a percentage of records in the inclusion set 212a which contain the corresponding content element, e.g., the inclusion frequency divided by the total number of records in the inclusion set 212a (referred to herein as the "inclusion percentage" or "IP");
 column 112f displays a percentage of records (expressed as a fraction) in the exclusion set 212b which contain the corresponding content element, e.g., the exclusion frequency divided by the total number of records in the exclusion set 212b (referred to herein as the "exclusion percentage" or "EP");

column 112g displays the difference between the inclusion percentage of column 112e and the exclusion percentage of column 112f, i.e., IP−EP (referred to herein as the "percentage difference" or "PD"); and column 112h displays the absolute value of the percentage difference of column 112g (expressed as a fraction), i.e. |IP−EP| (referred to herein as the "absolute percentage difference" or "APD").

The result set metrics module 218 may calculate the values in columns 112c-h based on the result set 212 and/or the unique content element list 232. For example:

the result set metrics module 218 may calculate the values in column 112c by counting the number of occurrences of each unique content element in the inclusion set 212a;

the result set metrics module 218 may calculate the values in column 112d by counting the number of occurrences of each unique content element in the exclusion set 212b;

the result set metrics module 218 may calculate the values in column 112e by dividing the count in column 112c in each row by the number of records in the inclusion set 212a;

the result set metrics module 218 may calculate the values in column 112f by dividing the count in column 112d in each row by the number of records in the exclusion set 212b;

the result set metrics module 218 may calculate the values in column 112g by subtracting the value of column 112f from the value of column 112e in the same row; and the result set metrics module 218 may calculate the values in column 112h by calculating the absolute value of column 112g in each row.

As will be described in more detail below, any of the calculations listed above may be grouped, e.g., by patient, visit, or document, so that the calculated and displayed number of occurrences need not be the total number of occurrences of each unique content element in the entire inclusion set 212a or exclusion set 212b, but rather may be the number of unique occurrences of each unique content element per patient, visit, or document in the inclusion set 212a or exclusion set 212b. For example, if calculations are grouped by document, and the word "death" occurs in a particular document fifteen times, such multiple occurrences would cause the count of the word "death" to be increased by one, not by fifteen.

In practice, the number of unique content elements in the result set 212 may be very large, possibly in the thousands or larger. As a result, it may be impractical for the user 206 to manually review the list of unique content items and to select individual content items for exclusion from the predictive model without assistance from the system 200. Embodiments of the present invention may provide such assistance to enable the user 206 to review and exclude content elements from the predictive model much more efficiently than would be possible with a purely manual review.

For example, the system 400 may include a unique content element list sorter 234, which may sort the list of unique content elements 232 in descending order of the absolute percentage difference (i.e., the values in column 112h), thereby producing a sorted unique content element list 236 (FIG. 5, operation 504). The GUI 100 may display the sorted list of unique content elements 236 to the user 206 in the GUI 100 in the resulting sorted order. FIG. 1 shows an example in which the sorted list 236 is displayed in this manner. Such sorting may be performed automatically, i.e., not in response to input received from the user 206, or the sorter 234 may perform such sorting in response to input from the user 206, such as a mouse click on the column heading of column 112h.

Although the same techniques may be applied to sort and display the list of unique content elements based on any of the columns 112a-i, sorting based on the absolute percentage difference of column 112h may be particularly useful to the user 206 for purposes of enabling the user to select content elements for exclusion from the predictive model. The reason is that sorting the list of unique content elements based on the absolute percentage difference orders the list so that the content elements that most strongly discriminate the inclusion set 212a from the exclusion set 212b are displayed closest to the top of the list. Sorting based on the absolute percentage difference of column 112h also makes it computationally feasible for a computer to develop the predictive model 250 in a computationally feasible period of time.

The system 400 may also include a filtering module 238 which may filter content elements from the sorted list 236 to produce a filtered list of content elements 240 (FIG. 5, operation 506). For example, the filtering module 238 may remove from the sorted list 236 all but the first N content elements to produce the filtered list 240. The value of N may be obtained by the module 238 in any way. For example, the GUI 100 may provide an input component 120c which enables the user 206 to specify the value of N. If the content elements displayed in the table 110 are sorted in descending order by absolute percentage difference (column 112h), then the user 206 may input a value N into the input component 120c and thereby cause the GUI 100 to display only the content elements from the result set 212 having the N highest absolute percentage difference values. In other words, inputting the value N into the input component 120c causes the filtering module 238 to filter, from the sorted list 236, all but the N content elements having the highest absolute percentage difference values, and then causes the GUI 100 to display to the user 206 only the resulting filtered list 240.

In the example of FIG. 1, the user 206 has input a value of N=100. This is merely an example and does not constitute a limitation of the present invention. More generally, N may have any value. However, it is particularly valuable to use relatively low values of N, such as 10, 20, 50, or 100, so that the filtered list 240 is small enough to be reviewable by the human user 206 in a reasonable amount of time.

As another example, the filtering module 238 may remove from the sorted list 236 all content elements for which the value of |IP−EP| is less than some predetermined threshold value.

In the example described above, the sorted list 236 is displayed to the user 206 before the sorted list 236 is filtered by the filtering module 238, this is merely an example and does not constitute a limitation of the present invention. Alternatively, for example, the unique content element list 232 may be both sorted by the sorter 234 and filtered by the filter 238 (in either order) before the resulting sorted and filtered list 240 is displayed to the user 206.

Individual content elements may be excluded from the filtered list, either in addition to or instead of the content elements excluded automatically by the filtering module 238. In general, the system 400 may include a content element excluder 242, which may exclude (remove) one or more content elements from the filtered list 240 to produce a final content element list 246 (FIG. 5, operation 508). The content element excluder 242 may select content elements to exclude in any of a variety of ways. For example, the content element excluder 242 may select content elements to exclude based on input received from the user 206 specifying the content elements to exclude. As a particular example, the table 110 may include column 112*i*, into which the user 206 may provide input which specifies zero or more particular content elements to exclude from the content element list. In the example of FIG. 1, the user 206 may specify that a particular content element is to be excluded from the content element list by checking the box in column 112*i* of the row representing that content element. For example, FIG. 1 shows that the user 206 has checked the box in column 112*i* of row 114*a*, which represents the concept of "death." The user 206 may have chosen to exclude this concept from the content element list (and therefore from the predictive model to be generated) because death is the concept that the user 206 wishes to predict with the predictive model. Therefore, the predictive model will be more suitable for predicting whether new records which do not explicitly specify that the corresponding patient is dead fall within the inclusion set if the explicitly-encoded concept of death is excluded from the predictive model.

The user 206 may, however, choose whether to exclude particular content elements from the predictive model in any manner desired by the user 206. The user 206 may, for example, choose not to exclude any content elements from the predictive model. As another example, the user 206 may choose to exclude multiple content elements from the predictive model.

Furthermore, although in the example of FIG. 1, the GUI 100 does not exclude any content elements from the predictive model by default, and relies on manual input from the user 206 to exclude content elements from the predictive model, this is merely an example and does not constitute a limitation of the present invention. For example, the system 200 may automatically select one or more content elements for exclusion from the predictive model, although the user 206 may subsequently override such exclusions manually. For example, the system 200 may compare the inclusion set criteria to the exclusion set criteria to identify one or more differences between the two sets of criteria, such as content elements contained within the inclusion set criteria but not within the exclusion set criteria and/or content elements contained within the exclusion set criteria but not within the inclusion set criteria. The system 200 may then automatically select any such terms for exclusion from the content element list by the content element excluder 242. For example, referring to the inclusion set criteria input 210*a* ("CHF AND Low Ejection Fraction AND Dead") and the exclusion set criteria input 210*b* ("CHF AND Low Ejection Fraction AND Alive") shown in FIG. 1, the system 200 may compare these two criteria input sets 210*a* and 210*b* to each other to determine that the term "Dead" is included in the inclusion set criteria input 210*a* but not in the exclusion set criteria input 210*b*. In response, the system 200 may automatically exclude "Dead" and synonyms of "Dead" from the content element list 240.

The GUI 100 may enable records represented in the table 110 to be displayed to the user 206 to enable the user 206 to obtain additional information about those records. For example, the table 110 may include column 112*j*. To cause the system 200 to display some or all of the records containing a particular content element, the user 206 may check the box in column 112*j* within the row corresponding to the particular content element. In response, the system 200 may display some or all of the corresponding content elements. For example, if the user 206 selects the box in column 112*j* of row 114*d*, corresponding to the content element "Abscess," the system 200 may display some or all of the records containing the content element "Abscess." The system 200 may display such records in any of a variety of ways, such as by displaying summaries of such records (e.g., the portions of such records containing the relevant content element) and/or by enabling the user 206 to navigate through such records.

The GUI 100 may include features that enable the user 206 to select the metrics that are calculated and displayed in the metrics area 110. For example, the GUI 100 may provide input components 120*a* which allow the user 206 to indicate how to calculate the count of documents in the inclusion set 212*a* (as displayed in column 112*c*) and the count of documents in the exclusion set 212*b* (as displayed in column 112*d*). For example:

- the user 206 may select the "Documents" radio button in radio button group 120*a* to cause the result set metrics module 218 to count the number of unique documents in the dataset 202 that match the inclusion set criteria in the inclusion set count in column 112*c*, and to count the number of unique documents in the dataset 202 that match the exclusion set criteria in the exclusion set count in column 112*d*;
- the user 206 may select the "Patients" radio button in radio button group 120*a* to cause the result set metrics module 218 to count the number of unique patients in the dataset 202 who match the inclusion set criteria in the inclusion set count in column 112*c*, and to count the number of unique patients in the dataset 202 who match the exclusion set criteria in the exclusion set count in column 112*d*; and
- the user 206 may select the "Visits" radio button in the radio button group 120*a* to cause the result set metrics module 218 to count the number of unique visits in the dataset 202 that match the inclusion set criteria in the inclusion set count in column 112*c*, and to count the number of unique visits in the dataset 202 that match the exclusion set criteria in the exclusion set count in column 112*d*.

The particular groupings enabled by the radio button group 120*a* in FIG. 1 (i.e., Documents, Patients, and Visits) is merely one example and does not constitute a limitation of the present invention. Embodiments of the present invention may use groupings not shown in FIG. 1, and need not use all of the groupings shown in FIG. 1.

As another example, the GUI 100 may provide input components 120*b* which allow the user 206 to indicate whether the content element lists 232, 236, 240, and 246 should contain only concepts, only free-form text (terms), or both concepts and free-form text. The user 206 may, for example, find it helpful to display only concepts based on the assumption that explicitly-encoded concepts are more likely to reflect facts accurately than free-form text.

As another example (although not shown in FIG. 1), the GUI may separately display variations on a concept or term using metadata associated with the concept or term. For example, consider the term "chest pain." The GUI 100 may identify and display variations of such a term, such as, "positively asserted chest pain in patient," "negatively asserted chest pain in patient," "uncertain assertion of chest pain in patient," "positively asserted chest pain in patient's family history," and "negatively asserted chest pain in patient's family history." As another example, consider the concept of sodium level. The GUI 100 may identify and display ranges of parameter values associated with such a concept, such as "Sodium Level>150" and "Sodium Level<150." In such cases, the GUI 100 may enable the user 206 to select one or more such variations for inclusion within or exclusion from the predictive model 250.

Once the system 200 has generated and displayed the final content element list 246, this list 246 may be used to generate a predictive model 250. In particular, the system 400 of FIG. 4 includes a predictive model generator 248 which generates a predictive model 250 based on the final content element list 246 and the original dataset 202 (FIG. 5, operation 510). The predictive model generator 248 may use any of a variety of known techniques to generate the predictive model 250, such as regressions, naïve Bayes networks, artificial neural networks, either individually or in any combination. The predictive model generator 248 may also validate the predictive model 250 using any of a variety of techniques, such as bootstrapping, jackknife, and Monte Carlo techniques, either individually or in any combination.

The predictive model generator 248 may generate the predictive model 250, for example, in response to the user 206 providing input to the system 400, such as by pressing button 130. Once the predictive model 250 has been generated, the GUI 100 may display information about the predictive model 250, such as its regression formula, derivation sensitivity, derivation specificity, validation sensitivity, and validation specificity, in an output region 132. The system 200 may generate the contents of the region 132 by, for example, dividing the dataset 202 into two subsets: a derivation set and a validation set. The predictive model 250 may be generated based on the derivation set, rather than based on the entire dataset 202. The predictive model 250 may then be applied to the validation set and the performance of the predictive model 250 on the validation set may be measured. The resulting measurements may be displayed in output region 132. The process just described may be performed a plurality of times, each time dividing the dataset 202 into different derivation sets and validation sets, such as by using a Monte Carlo simulation.

If the user 206 is not satisfied with the predictive model 250, the user 206 may perform any of the actions described above (such as modifying the inclusion set criteria and/or exclusion set criteria) and then generate a new predictive model by again pressing button 130. Once the user 206 is satisfied with the predictive model 250, the user 206 may cause the system 400 to save the predictive model 250 for future use by pressing button 134. In this way, embodiments of the present invention enable the predictive model 250 to be iteratively assessed and improved.

The predictive model 250 may then be applied to new records (e.g., records that were not in the dataset 202 that was used to generate the predictive model 250) to predict whether each such record has the characteristics of interest to the user 206.

The features described above provide a variety of advantages, such as the following:

The content elements displayed at the top of the list in the table 110 are highly discriminatory between the inclusion set 212a and the exclusion set 212b, and therefore have a high likelihood of being useful features to the predictive model.

The number of content elements that the user 206 must review is constrained significantly enough to make such a review feasible.

The number of input variables the computer must process to create the predictive model 250 is constrained enough to be computationally fast and efficient.

Furthermore, the techniques disclosed herein provide the user with visibility into the discriminatory power of the terms that the system will use for prediction. This visibility can increase the confidence that the user has in the resulting predictive model 250, and can provide insights and value that would not otherwise be available or visible.

Furthermore, the techniques disclosed herein enable non-technicians and non-statisticians to quickly and easily identify the content elements that most strongly discriminate membership between the inclusion set and the exclusion set, and then to quickly and easily create predictive models based on those data elements.

Furthermore, the techniques disclosed herein enable predictive models to be created easily based on datasets that include unstructured data (e.g., data contained in free-form text), and based on datasets that include a combination of unstructured data and structured data. Although the techniques disclosed herein do not require data to be stored in structured form, the techniques disclosed herein are capable of generating predictive models based on structured data. As a result, the techniques disclosed herein provide an advantage over systems that can only be used to generate predictive models based on structured data.

If the dataset 202 is small, then applying embodiments of the present invention to such a dataset 202 may result in generating a predictive model 250 that overfits the dataset. Embodiments of the present invention may use any of a variety of techniques to compensate for or prevent such overfitting of the predictive model 250 to the dataset 202. For example, embodiments of the present invention may require a (user-configurable) minimum number of records per input. For example, if the minimum required number of records per input is 500, and querying the dataset 202 using the inclusion set criteria produces an inclusion set 212a containing 50,000 records, then embodiments of the present invention may permit up to 500 inputs (50,000/100). In one embodiment of the present invention, the maximum number of permitted inputs may be selected as the minimum of the following three values: (1) a user-configurable maximum number of inputs; (2) the result of the calculation described above (number of results divided by user-configurable maximum number of records per input); and (3) a number of inputs selected by the user (e.g., if the user is offered up to 100 inputs based on the result of the calculation above and the user selects 75 inputs, then 75 may be selected as the maximum number of permitted inputs).

The term "predictive model," as used herein, is not limited to a model that may be used to make predictions about facts in the future. Rather, the term "predictive model," as used herein, includes models which may be used to infer (actual or likely) facts in the past. More generally, the term "predictive model," as used herein, includes models which may be used to infer (actual or likely) facts from incomplete data sets, whether those facts relate to events in the past and/or to events in the future. Therefore, terms such as "predicting," as used herein, should be understood to refer to inferring, whether or not the resulting prediction/inference results in a fact associated with the past, present, or future. For example, predictive models of the kind disclosed herein may be used to infer that a particular patient is highly likely to be associated with a particular outcome. Even if the patient experienced the outcome in the past, such an inference is an example of a "prediction" as that term is used herein. As a particular example, embodiments of the present invention may be used to infer that a particular patient likely went into the intensive care unit (ICU) in the past, based on data in the patient's EHR record, even if that record does not explicitly indicate that the patient went into the ICU.

This is merely one example of ways in which embodiments of the present invention enable predictive models to be created quickly and easily based on "big data" datasets, in which the number of possible inputs may be massive and otherwise difficult to analyze meaningfully. One particular benefit of embodiments of the present invention in this regard is that they reduce the need to select predictor variables, based on the variables that the user already knows to be predictive. Existing systems typically are limited to creating predictive models which encode the existing domain knowledge of the user. In other words, such systems rely on the user to know which variables are predictive, and then generate predictive models based on the variables known by the user to be predictive.

In contrast, embodiments of the present invention may be used to create predictive models even if the user does not know all or any of the variables that are predictive. As described above, embodiments of the present invention may be used to suggest predictive variables to the user even if the user did not have advance knowledge of such variables. Furthermore, even if the user does have knowledge of some of the predictive variables and provides such variables as inputs to the system 200 for inclusion in the predictive model, the system 200 may nonetheless suggest additional predictive variables to the user, thereby supplementing the user's pre-existing knowledge. In this way, embodiments of the present invention may be used to create predictive models which include both user-supplied predictive variables and predictive variables which were suggested automatically by the system and confirmed by the user.

Embodiments of the present invention may be particularly useful in connection with datasets which are both large and complex. It can be difficult or impossible for a human user, even a human user with expert domain knowledge, to identify predictive variables based on such a data set (such as a dataset containing many thousands of unique terms and concepts). By using a computer to perform the initial filtering of the inputs (features), e.g., using the absolute value of the percentage difference (APD), and thereby to produce a filtered and sorted list of potentially predictive variables for human review, embodiments of the present invention make it feasible for the human user to filter the computer-generated list and thereby to produce a final list of predictive variables, even when the dataset is large and complex.

Furthermore, existing systems which attempt to generate predictive models fully automatically tend to require massive amounts of computer processing resources when applied to large and complex datasets. In contrast, embodiments of the present invention may be used to generate predictive models much more efficiently, i.e., using significantly smaller amounts of computer processing resources than existing systems because embodiments of the present invention use a computer to generate an initial set of variables for review by a human user, who then filters the initial set of variables to produce a final set of variables to include in the predictive model. Embodiments of the present invention can produce the initial set of variables highly efficiently, even when applied to large and complex data sets. As a result, embodiments of the present invention may be used to produce predictive models using less powerful computers than existing systems, or in less time than existing systems using the same computers. Embodiments of the present invention, therefore, represent improved computer systems for generating predictive models more efficiently than existing systems.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

Functions described herein may be performed in sequences other than those described herein. For example, the particular sequence of operations illustrated in FIGS. 4 and 5 is merely an example and does not constitute a limitation of the present invention. The same functions may be performed in other sequences. For example, the sorting function performed by the sorter 234 may be performed after the filtering module 238 produces the filtered list, in which case the filtering module 238 may operate on the unique content element list 232 to produce output which is then sorted by the sorter 234 to produce output which is then operated on by the individual content element excluder 242.

Not all functions described herein need be performed by all embodiments of the present invention. For example, certain embodiments of the present invention may exclude one or more of the unique content element sorter 234, the filtering module 238, and the content element excluder 242 (FIG. 4). As a result, it should be understood that the final content element list 246 need not be produced as a result of the functions performed by all of the sorter 234, filtering module 238, and excluder 242, but instead may be produced as a result of functions performed by any one or more of the softer 234, filtering module 238, and excluder 242.

It should be appreciated that the GUI 100 shown in FIG. 1 is merely an example and does not constitute a limitation of the present invention. Other GUIs consistent with embodiments of the present invention may, for example, omit information shown in the GUI of FIG. 1, display information in addition to that shown in the GUI of FIG. 1, display the same information as that shown in the GUI of FIG. 1 but in a different form, or any combination thereof. For example, the GUI may include a word cloud which illustrates the frequencies of terms in the inclusion set 212a and/or exclusion set 212b by varying the font size of such terms as a function of their number of occurrences in the inclusion set 212a or exclusion set 212b.

Although the description herein focuses on techniques for enabling the user 206 to manually select content elements for inclusion within the final content element list 246 that is used to generate the predictive model 250, this is merely an example and does not constitute a limitation of the present invention. Additionally or alternatively, for example, machine learning algorithms, such as feature selection, could be used to automatically select content elements with the highest discriminatory power. The content elements produced by such machine learning algorithms may be combined with the content elements produced by the techniques disclosed herein to produce the final content element list 246.

For example, the user 206 may select an initial set of content elements to use to generate the predictive model 250 in the manner described above. The resulting predictive model 250 may then be applied to a validation dataset (which may differ from the dataset that was used to generate the predictive model 250, such as by including one or more data elements not contained within the dataset that was used to generate the predictive model 250) to produce results in the form of a subset of the validation dataset. Such results are the subset of the validation dataset which the predictive model predicts to satisfy the inclusion set criteria. Such results may be measured and provided to the user 206, such as by displaying the results in the output area 132. The user 206 may then provide feedback regarding the correctness of the predictions and the system 400 may use that feedback to identify additional content elements to include in the content element list, and then generate a new predictive model 250 based on the modified content element list. This process may be repeated any number of times to iteratively improve the predictive model 250.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor, the method comprising:
   (A) searching a first dataset for elements matching inclusion set criteria to identify an inclusion set, wherein the inclusion set comprises a first subset of the first dataset;
   (B) searching the dataset for elements matching exclusion set criteria to identify an exclusion set, wherein the exclusion set comprises a second subset of the first dataset;
   (C) identifying a set of unique content elements selected from the inclusion set and the exclusion set;
   (D) sorting the set of unique content elements to produce a sorted set of unique content elements;
   (E) filtering, from the sorted set of unique content elements, all but the first N elements in the sorted set of unique content elements to produce a filtered set of unique content elements;
   (F) excluding at least one content element from the filtered set of unique content elements to produce a final set of unique content elements; and
   (G) producing a predictive model based on the final set of unique content elements;
   wherein (D) comprises, for each of the unique content elements E:
   (D)(1) identifying a percentage IP of records in the inclusion set containing element E;
   (D)(2) identifying a percentage EP of records in the exclusion set containing element E;
   (D)(3) identifying an absolute value |IP−EP| of a difference between IP and EP; and
   (D)(4) sorting the set of unique content elements in descending order by the absolute value |IP−EP| of the unique content elements in the set of unique content elements to produce the sorted set of unique content elements.

2. The method of claim 1, further comprising:
   (H) before (E), receiving input representing N from a user.

3. The method of claim 1, wherein (F) comprises:
   (F)(1) providing output to a user representing at least some of the filtered set of unique content elements.

4. The method of claim 3, wherein (F) further comprises:
   (F)(2) receiving input from a user specifying the at least one content element to exclude from the filtered set of unique content elements.

5. The method of claim 1, wherein the set of unique content elements includes at least one discrete content element.

6. The method of claim 1, wherein the set of unique content elements includes at least one free-from text content element.

7. The method of claim 1, wherein the set of unique content elements includes at least one concept content element.

8. The method of claim 7, wherein the set of unique content elements further includes at least one discrete content element.

9. The method of claim 7, wherein the set of unique content elements further includes at least one free-form text content element.

10. The method of claim 1, wherein at least one of the unique content elements is not in the inclusion set.

11. The method of claim 1, where at least one of the unique content elements is not in the exclusion set.

12. The method of claim 11, where at least one of the unique content elements is not in the inclusion set.

13. The method of claim 1, further comprising:
(H) applying the predictive model to a second dataset to produce a subset of the second dataset which are predicted by the predictive model to satisfy the inclusion set criteria.

14. The method of claim 1, wherein the exclusion set criteria represent the logical complement of the inclusion set criteria.

15. A non-transitory computer-readable medium comprising computer program instructions which are executable by at least one computer processor to perform a method, the method comprising:
(A) searching a first dataset for elements matching inclusion set criteria to identify an inclusion set, wherein the inclusion set comprises a first subset of the first dataset;
(B) searching the dataset for elements matching exclusion set criteria to identify an exclusion set, wherein the exclusion set comprises a second subset of the first dataset;
(C) identifying a set of unique content elements selected from the inclusion set and the exclusion set;
(D) sorting the set of unique content elements to produce a sorted set of unique content elements;
(E) filtering, from the sorted set of unique content elements, all but the first N elements in the sorted set of unique content elements to produce a filtered set of unique content elements;
(F) excluding at least one content element from the filtered set of unique content elements to produce a final set of unique content elements; and
(G) producing a predictive model based on the final set of unique content elements;
wherein (D) comprises, for each of the unique content elements E:
(D)(1) identifying a percentage IP of records in the inclusion set containing element E;
(D)(2) identifying a percentage EP of records in the exclusion set containing element E;
(D)(3) identifying an absolute value |IP−EP| of a difference between IP and EP; and
(D)(4) sorting the set of unique content elements in descending order by the absolute value |IP−EP| of the unique content elements in the set of unique content elements to produce the sorted set of unique content elements.

16. The non-transitory computer-readable medium of claim 15, further comprising:
(H) before (E), receiving input representing N from a user.

17. The non-transitory computer-readable medium of claim 15, wherein (F) comprises:
(F)(1) providing output to a user representing at least some of the filtered set of unique content elements.

18. The non-transitory computer-readable medium of claim 17, wherein (F) further comprises:
(F)(2) receiving input from a user specifying the at least one content element to exclude from the filtered set of unique content elements.

19. The non-transitory computer-readable medium of claim 15, wherein the set of unique content elements includes at least one discrete content element.

20. The non-transitory computer-readable medium of claim 15, wherein the set of unique content elements includes at least one free-from text content element.

21. The non-transitory computer-readable medium of claim 15, wherein the set of unique content elements includes at least one concept content element.

22. The non-transitory computer-readable medium of claim 21, wherein the set of unique content elements further includes at least one discrete content element.

23. The non-transitory computer-readable medium of claim 21, wherein the set of unique content elements further includes at least one free-form text content element.

24. The non-transitory computer-readable medium of claim 15, wherein at least one of the unique content elements is not in the inclusion set.

25. The non-transitory computer-readable medium of claim 15, where at least one of the unique content elements is not in the exclusion set.

26. The non-transitory computer-readable medium of claim 25, where at least one of the unique content elements is not in the inclusion set.

27. The non-transitory computer-readable medium of claim 15, further comprising:
(H) applying the predictive model to a second dataset to produce a subset of the second dataset which are predicted by the predictive model to satisfy the inclusion set criteria.

28. The non-transitory computer-readable medium of claim 15, wherein the exclusion set criteria represent the logical complement of the inclusion set criteria.

* * * * *

UNITED STATES PATENT AND TRADEMARK OFFICE
CERTIFICATE OF CORRECTION

| | | |
|---|---|---|
| PATENT NO. | : 9,251,203 B2 | Page 1 of 1 |
| APPLICATION NO. | : 14/136386 | |
| DATED | : February 2, 2016 | |
| INVENTOR(S) | : Handler et al. | |

It is certified that error appears in the above-identified patent and that said Letters Patent is hereby corrected as shown below:

Specification

In Column 2, Line 51, delete "dataset 204a-c" and insert -- dataset 202 --, therefor.

In Column 10, Line 55, delete "filter 238" and insert -- filtering module 238 --, therefor.

Claims

In Column 18, Line 48, in Claim 5, delete "unique5" and insert -- unique --, therefor.

Signed and Sealed this
Twelfth Day of July, 2016

Michelle K. Lee
*Director of the United States Patent and Trademark Office*